July 21, 1959 — A. H. FRÖHLICH ET AL — 2,895,169
SECTIONAL VULCANIZING APPARATUS
Filed July 30, 1956
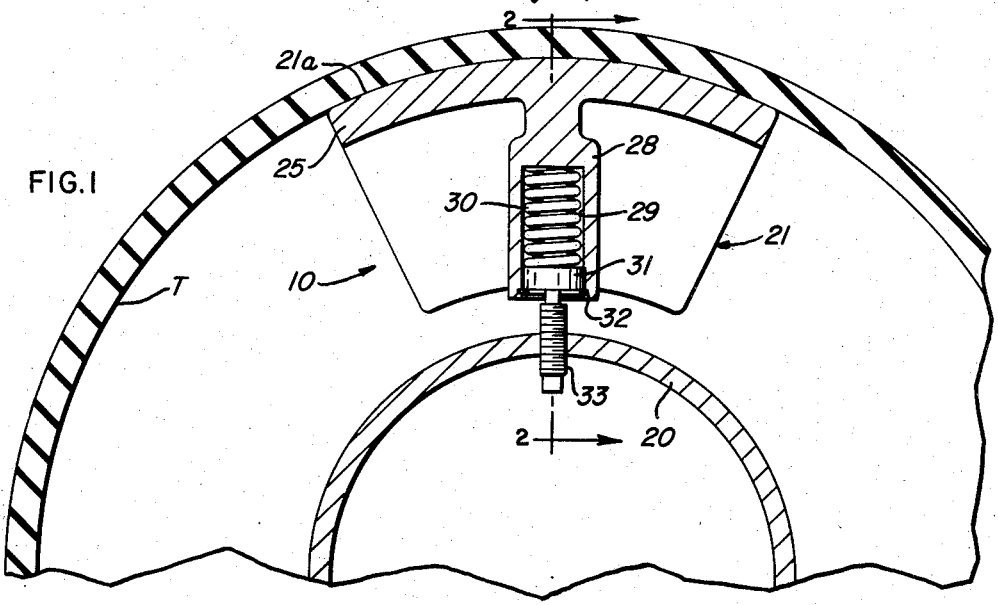
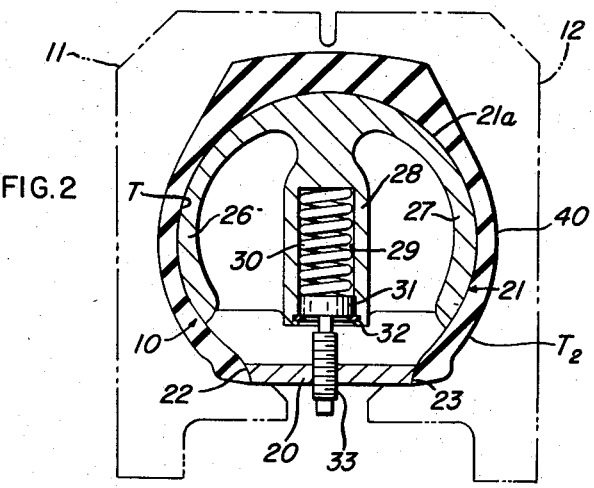
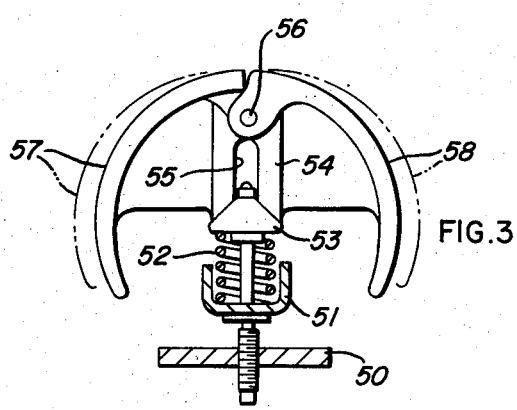
INVENTORS
ADOLF FRÖHLICH &
EDWARD J. HARRIS
BY
ATTORNEY

United States Patent Office 2,895,169
Patented July 21, 1959

2,895,169
SECTIONAL VULCANIZING APPARATUS

Adolf H. Fröhlich and Edward J. Harris, Akron, Ohio, assignors to The Cleveland Trust Company, Cleveland, Ohio, as trustee Application July 30, 1956, Serial No. 600,936

4 Claims. (Cl. 18—45)

This invention relates to the art of pneumatic tires, and in particular has reference to improvements and apparatus employed in repairing localized damage in the tread or sidewall portions of a pneumatic tire.

In the known prior art, breaks or ruptures in the sidewall or tread regions of a pneumatic tire have been repaired in the past by the use of sectional vulcanizing apparatus wherein a patch or wall section is placed in a ruptured area of a tire and then subjected to the heat of vulcanization in a localized area so that the same will mold into the remainder of the tire body and thus effectuate a repair thereof.

While the prior art has operated satisfactorily in certain favorable conditions, it has been found that the apparatus employed in this regard is not capable of utilization in connection with other apparatus normally employed in recapping operation with the result that separate and expensive equipment must be maintained for use in sectional vulcanizing of the type above described.

As a further disadvantage of the known prior art method of accomplishing sectional vulcanizing, it has been found that the same requires the presence of a localized source of heat immediately adjacent the localized area being treated, with the result that equipment of this type to provide this localized source of treatment must be furnished in addition to the normal equipment that is generally found in a recapping establishment.

As a still further disadvantage of the known types of prior art devices in this field, it has been found that the effectiveness of such sectional vulcanizing is directly proportional to the amount of pressure that is able to be applied during the positioning and curing of the same with the result that where this operation is conducted in the absence of substantially any application pressure, it has been found that a relatively poor repair will occur.

It has been discovered that improved results in this regard will occur if a support plate can be tensionally urged against the ruptured area interiorly of the tire so as to provide a support against which localized pressure can be obtained.

It has been further discovered that if such a support plate or shoe is tensionally urged outwardly from the rim area of the tire, that the sectional vulcanizing can be effectuated during a recapping operation wherein a replacement tread is being applied exteriorly of the tire in known manner.

It accordingly becomes the principal object of this invention to provide a support plate or vulcanizing shoe capable of being positioned interiorly of the tire and being adapted to be urged outwardly from the rim portion thereof so as to apply a pressure against the internal wall of the tire being treated.

It is a further object of the invention to provide a device of the character above described that is capable of use with certain component parts of standardized recapping equipment wherein a minimum of additional component parts will be required to effectuate sectional vulcanizing of the type disclosed herein.

It is a still further object of this invention to provide a sectional vulcanizing apparatus of the character above described that may be easily and automatically adjusted to accommodate a plurality of different tires.

These and other objects of the invention will become more apparent upon a reading of the following brief specification, considered and interpreted in the light of the accompanying drawings.

Of the drawings:

Figure 1 is a sectional view showing the improved apparatus positioned in a tire being vulcanized.

Figure 2 is a sectional view taken on substantially lines 2—2 of Figure 1.

Figure 3 is a sectional view similar to Figure 2 but showing a modified form of the invention.

Referring now to the drawings and in particular to Figures 1 and 2 thereof, the improved supporting device, generally designated by the numeral 10, is shown applied against the internal wall of a tire T that is positioned between a closed mold section 11 and 12 of a vulcanizing press of known type (not shown).

The support device 10 per se includes an endless ring 20 that shiftably supports thereon a shoe member indicated generally by the numeral 21; the arrangement being such that the endless ring has its opposed edges 22 and 23 thereof bevelled or contoured for engagement against the inner bead surfaces of the tire T, while the shoe 21 includes a contact face 21a that is contoured for reception against the entire inner wall surface of the tire T in a localized area thereof.

To this end, the face 21 is shown defined by a contoured plate 25 that is arched throughout its longitudinal length (Figure 1) to conform to the radial diameter of the inner crown region of the tire T. Additionally, this plate 25 is contoured transversely of its width (Figure 2) to define side portions 26 and 27 that respectively engage against the internal sidewall areas of the tire being cured.

In addition to the aforementioned component parts, the plate 25 further includes an inwardly depending (Figure 2) hollow boss member 28 that projects radially inward towards the endless plate 25 as is best shown in Figures 1 and 2 of the drawing. This boss member 28 includes an axial bore 29 within which may be seated a spring 30 that is operable against a piston 31 that in turn carries a stud bolt 33 that secures piston 31 with respect to the endless ring 20 as is best shown in Figure 2 of the drawings. Lock ring 32 limits movement of piston 31 in this regard in known manner.

The above arrangement of the component parts thus permits the spring 30 to be compressed to vary the radial distance between the face 22 and the ring 20 for purposes that will be described.

In use or operation of the improved device, it is merely necessary that the bead portions of the tire T be spread slightly so as to permit the entire plate member 21 to be passed therebetween so that the face portion 21a thereof may be engaged against the internal crown of the tire T as is shown clearly in Figure 2 of the drawings. During this positioning it is apparent that the leg portions 26 and 27 will also engage the internal sidewall area of the tire T with the result that throughout an arcuate segment of its internal wall portions, the tire T will be contacted by the exteriorly presented surface of the shoe member 21. In this regard, it is to be noted that the shoe member will be positioned so as to have its surfaces cover the region of rupture in the tire, and, accordingly, in Figure 2 this localized region is indicated by the numeral 40 on the sidewall area $T_s$ of the tire T.

When the shoe has been inserted as just described, the ring may be adjusted so that its opposed edge portions 22 and 23 thereof are in engagement with the internal beads of the tire T and in this condition the device will be further positioned with the spring 30 slightly compressed so as to cause the shoe member 21 to move radially outward to thus insure a firm supporting contact of the exterior surfaces of the same with the internal walls of the tire T.

In this regard, it is to be noted that the endless ring 20 will be fixed with respect to the tire T as a result of the bevelled contact between the edges 22 and 23 and the internal bead walls of the tire T and thus, with the ring 20 fixedly positioned, the expansion forces of the spring 30 will be directed to increasing the degree of contact between the shoe 21 and the internal wall of the tire T by merely turning stud bolt 33.

With the shoe member positioned as just described, the sectional repair may be made as indicated at 40 in Figure 2 of the drawings, and at this time, the entire tire T may be placed in the mold and the same closed. With the mold closed, the heat of vulcanization may be applied to cause a vulcanization of the tire T, and during the curing that is necessary to vulcanize the replacement cap on the exterior of the tire T, it is manifest that the section 40 will be simultaneously vulcanized with respect to the sidewall region $T_s$ of the tire T.

Upon completion of the vulcanizing, the mold sections 11 and 12 may be separated in known manner and the tire T may be removed from the mold sections at which time the endless ring 20, together with the shoe 21 thereof, may be easily and quickly removed.

The modified form of the invention shown in Figure 3 of the drawings is exactly similar in principle to that previously described in connection with Figures 1 and 2 of the drawing with the single exception that the same contemplates variation of the transverse spacing between the leg sections thereof.

Accordingly, the same is shown in Figure 3 of the drawing as including an endless ring 50 that supports thereon a U-shaped bracket 51 that serves as a seat for spring 52 that in turn acts against plug head 53; the arrangement being such that this plug head 53 is geared to a vertically extending plate member 54 that has a slot 55 provided therein as best shown in Figure 3 of the drawings. Additionally, this plate 54 may include a pivot pin 56 to which is pivotally mounted leg sections 57 and 58, with these leg sections being movable between the full and chain-dotted line positions of Figure 3 upon shifting of the plate 54 with respect to a ring member 50.

In use or operation of this device, the same procedure is employed as previously described with the entire shoe assembly being passed through the spread bead walls of the tire T and located in covering relationship to the ruptured area of the tire T. During this positioning the ring 50 will be fixed with regard to the center line of the tire T as a result of the contact between the opposed edges, and internal bead walls, and accordingly, the spring 52 will urge the plug 53 outwardly so that the leg sections 57 and 58 will spread apart to assume the position shown in chain-dotted lines in Figure 3. At this time, full contact will be made between the external surface of the shoe mechanism and the internal surface of the tire, with the result that the tire may be positioned on the vulcanizing press for curing of the sectional repair therein which has previously been described.

It will be seen from the foregoing that there has been provided a new and novel type sectional vulcanizing apparatus characterized by the fact that the same is simple in use and is capable of utilization with standard equipment of the type normally found in recapping operations.

It has been further shown that the use of this inner supporting plate operates to firmly locate the sectional repair between the mold cavity and the shoe with the result that the same is firmly supported during its period of vulcanization. Such pressurized support in this localized area in effect "irons" the replacement section in place and insures a full and complete vulcanization, with the result that a strong and, a once-again, usable tire is provided.

While a full and complete description of this invention has been made in accordance with the patent statutes, it is to be understood that parts of the equivalent design may be substituted where obvious and accordingly, modifications of the invention may be resorted to without departing from the spirit hereof or the scope of the appended claims.

What is claimed is:

1. A sectional vulcanizing apparatus of the character described for use interiorly of a pneumatic tire having an internal wall surface and opposed bead portions, comprising; an endless ring having opposed axial edges receivable against the internal wall of a tire in the bead regions thereof; an arcuate shoe mold of concavo-convex cross-sectional configuration and adapted to have its external surfaces engaged flush with said internal wall of said tire; and means for shiftably mounting said shoe mold in radially projecting relationship with respect to the exterior of said ring; said shoe mold being rigid and being normally urged radially away from said ring; said endless ring coacting with said tire upon contact therewith to define a sealed internal annular chamber interiorly of said tire; said chamber remaining sealed upon contact of said shoe mold with said tire.

2. A sectional vulcanizing apparatus of the character described for use interiorly of a pneumatic tire having an internal wall surface and opposed bead portions, comprising; an endless ring having opposed axial edges receivable against the internal wall of a tire in the bead regions thereof; an arcuate shoe mold of concavo-convex cross-sectional configuration and adapted to have its external surfaces engaged flush with said internal wall of said tire; and means for shiftably mounting said shoe mold in radially projecting relationship with respect to the exterior of said ring; said shoe mold normally being urged radially outward from said ring; said shoe mold being rigid and being normally urged radially away from said ring; said endless ring coacting with said tire upon contact therewith to define a sealed internal annular chamber interiorly of said tire; said chamber remaining sealed upon contact of said shoe mold with said tire.

3. A sectional vulcanizing apparatus of the character described for use interiorly of a pneumatic tire having an internal wall surface and opposed bead portions, comprising; an endless ring having opposed axial edges receivable against the internal wall of a tire in the bead regions thereof; an arcuate shoe mold of concavo-convex cross-sectional configuration and adapted to have its external surfaces engaged flush with said internal wall of said tire; and means for shiftably mounting said shoe mold in radially projecting relationship with respect to the exterior of said ring; said means including telescoping members respectively carried by said ring and said shoe mold; said shoe mold being rigid and being normally urged radially away from said ring; said endless ring coacting with said tire upon contact therewith to define a sealed internal annular chamber interiorly of said tire; said chamber remaining sealed upon contact of said shoe mold with said tire.

4. A sectional vulcanizing apparatus of the character described for use interiorly of a pneumatic tire having an internal wall surface and opposed bead portions, comprising; an endless ring having opposed axial edges receivable against the internal wall of a tire in the bead regions thereof; an arcuate shoe mold of concavo-convex cross-sectional configuration and adapted to have its external surfaces engaged flush with said internal wall of said tire; and means for shiftably mounting said shoe mold in radially projecting relationship with respect to the exterior of said ring; said means including telescoping members respectively carried by said ring and said shoe mold; said telescoped members being urged axially apart under spring pressure; said shoe mold being rigid and being normally urged radially away from said ring; said endless ring coacting with said tire upon contact therewith to define a sealed internal annular chamber interiorly of said tire; said chamber remaining sealed upon contact of said shoe mold with said tire.

References Cited in the file of this patent

UNITED STATES PATENTS

| | | |
|---|---|---|
| 1,349,423 | Hopkinson | Aug. 10, 1920 |
| 2,317,676 | Dorsey | Apr. 27, 1943 |
| 2,697,252 | Clark | Dec. 21, 1954 |